US006735602B2

(12) United States Patent
Childress et al.

(10) Patent No.: US 6,735,602 B2
(45) Date of Patent: May 11, 2004

(54) METHOD AND APPARATUS FOR INTEGRATION OF EVENT MONITORING SYSTEMS

(75) Inventors: Rhonda L. Childress, Austin, TX (US); Prabhakar Gopalan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 09/981,871

(22) Filed: Oct. 18, 2001

(65) Prior Publication Data

US 2003/0078942 A1 Apr. 24, 2003

(51) Int. Cl.[7] .............................................. G06F 17/00
(52) U.S. Cl. ......................... 707/200; 707/10; 707/102; 707/101
(58) Field of Search ...................... 707/1–10, 200–206, 707/100–104.1; 709/200–229

(56) References Cited

U.S. PATENT DOCUMENTS

| 5,864,843 | A | 1/1999 | Carino, Jr. et al. ............. 707/4 |
| 6,105,017 | A | 8/2000 | Kleewein et al. .............. 707/2 |
| 6,282,546 | B1 | 8/2000 | Gleichauf et al. .......... 707/102 |
| 6,629,106 | B1 * | 9/2003 | Narayanaswamy et al. ........................ 707/104.1 |
| 6,633,878 | B1 * | 10/2003 | Underwood ................ 707/100 |
| 6,643,652 | B2 * | 11/2003 | Helgeson et al. ............. 707/10 |

OTHER PUBLICATIONS

Kuo et al, Design of networked visual monitoring systems, Circuits and systems, 2000 Proceedings, ISCAS 2000 Geneva, The 2000 IEEE International Symposium on, vol. 4, May 28–31, 2000, pp. 297–300, vol. 4.*

Xu et al., Dynamic tuning of XML storage schema in VXMLR, Database Engineering and Applications Symposium, 2003, Proceedings, Seventh International, Jul. 16–18, 2003, pp. 76–86.*

Patankar et al., A Directory service for a federation of CIM databases with migrating objects, Data Engineering, 1996. Proceedings of the Twelfth International Conference on, Feb. 26 Mar., 1996, 142–150*

* cited by examiner

*Primary Examiner*—David Jung
(74) *Attorney, Agent, or Firm*—Duke W. Yee; David A. Mims, Jr.; Stephen J. Walder, Jr.

(57) ABSTRACT

A method and apparatus for integrating event monitoring and management information from a plurality of different event monitoring and management systems are provided. With the method and apparatus, an event management system (EMS) portal is provided which performs the operations for integrating the event information from a plurality of different event management systems in a network. A human user, such as a system administrator, may send a request for event information to the EMS portal. The request may include selections of event management systems, event management tables, and/or fields in the event management tables that are of interest to the user. The EMS portal then uses database clients to query the databases for selected event management systems on the network. The queries request the event information corresponding to the selections in the request submitted by the user to the EMS portal. The event information is then sent to the EMS portal clients which store the event information in a portal database. The EMS portal then generates one or more event information reports and transmits them to the user.

30 Claims, 4 Drawing Sheets

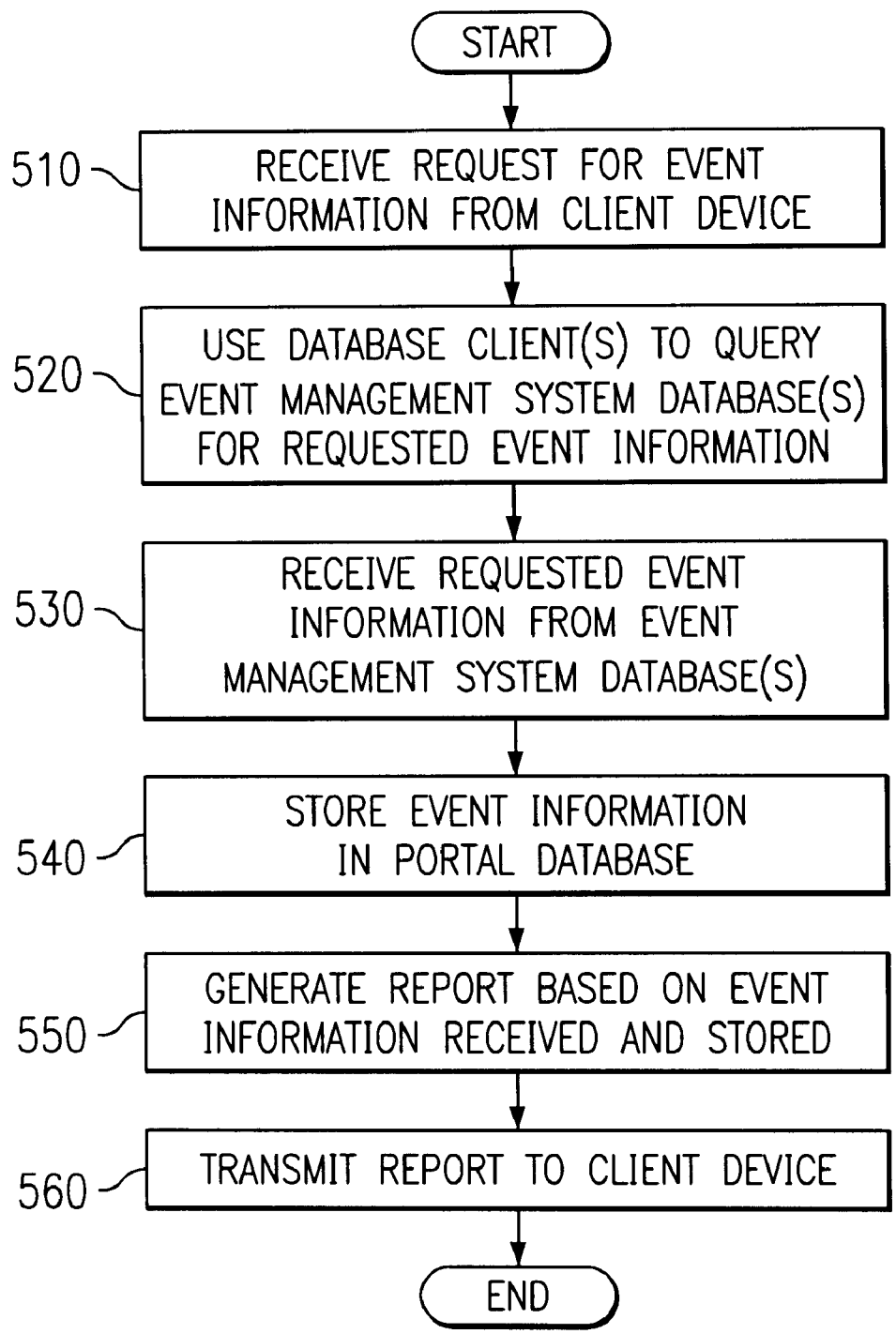

METHOD AND APPARATUS FOR INTEGRATION OF EVENT MONITORING SYSTEMS

BACKGROUND OF THE INVENTION

1. Technical Field

The present invention is directed to an improved data processing system and, in particular, an improved mechanism for event monitoring. More specifically, the present invention provides a mechanism through which event monitoring in a plurality of different event monitoring systems may be integrated.

2. Description of Related Art

An event management system is software that monitors servers, workstations and network devices for routine and non-routine events. For example, routine events such as log-ons help determine network usage, while unsuccessful log-ons are warnings that hackers may be at work or that the network access system is failing. Event managers provide realtime information for immediate use and log events for summary reporting used to analyze network performance.

An event management system is typically made up of client agents that reside in the remote devices, a central component for gathering the events, an event database and a reporting system to deliver the results. A human user, such as a system administrator, may make use of the reports provided by the reporting system to determine where possible repair or correction of the operation of the network may be required.

As networks become larger, more often the network may make use of event management software that is supplied by a plurality of different vendors. For example, a company may have Tivoli Enterprises Console monitoring events in one section of its network and may have another event management system, such as Unicenter from Computer Associates Incorporated, handling events in another area of the network. Thus, a system administrator must himself/herself make separate queries to the event database and reporting systems of each event management system in order to obtain an indication of where there are trouble spots in each area of the network. It is easy to see that this problem becomes cumbersome in large networks in which there are numerous different event management systems in use.

Thus, it would be beneficial to have a method and apparatus for integrating different event management systems such that a single reporting system may be used to report events from each of the event management systems.

SUMMARY OF THE INVENTION

The present invention provides a method and apparatus for integrating event monitoring and management information from a plurality of different event monitoring and management systems. With the present invention, an event management system (EMS) portal is provided which performs the operations for integrating the event information from a plurality of different event management systems in a network. A human user, such as a system administrator, may send a request for event information to the EMS portal. The request may include selections of event management systems, event management tables, and/or fields in the event management tables that are of interest to the user.

The EMS portal then uses database clients to query the databases for selected event management systems on the network. The queries request the event information corresponding to the selections in the request submitted by the user to the EMS portal. The event information is then sent to the EMS portal clients which store the event information in a portal database. The EMS portal then generates one or more event information reports and transmits them to the user.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart outlining an operation of the present invention.

DETAILED DESCRIPTION OF THE PREFERRED EMBODIMENT

Figure 1:
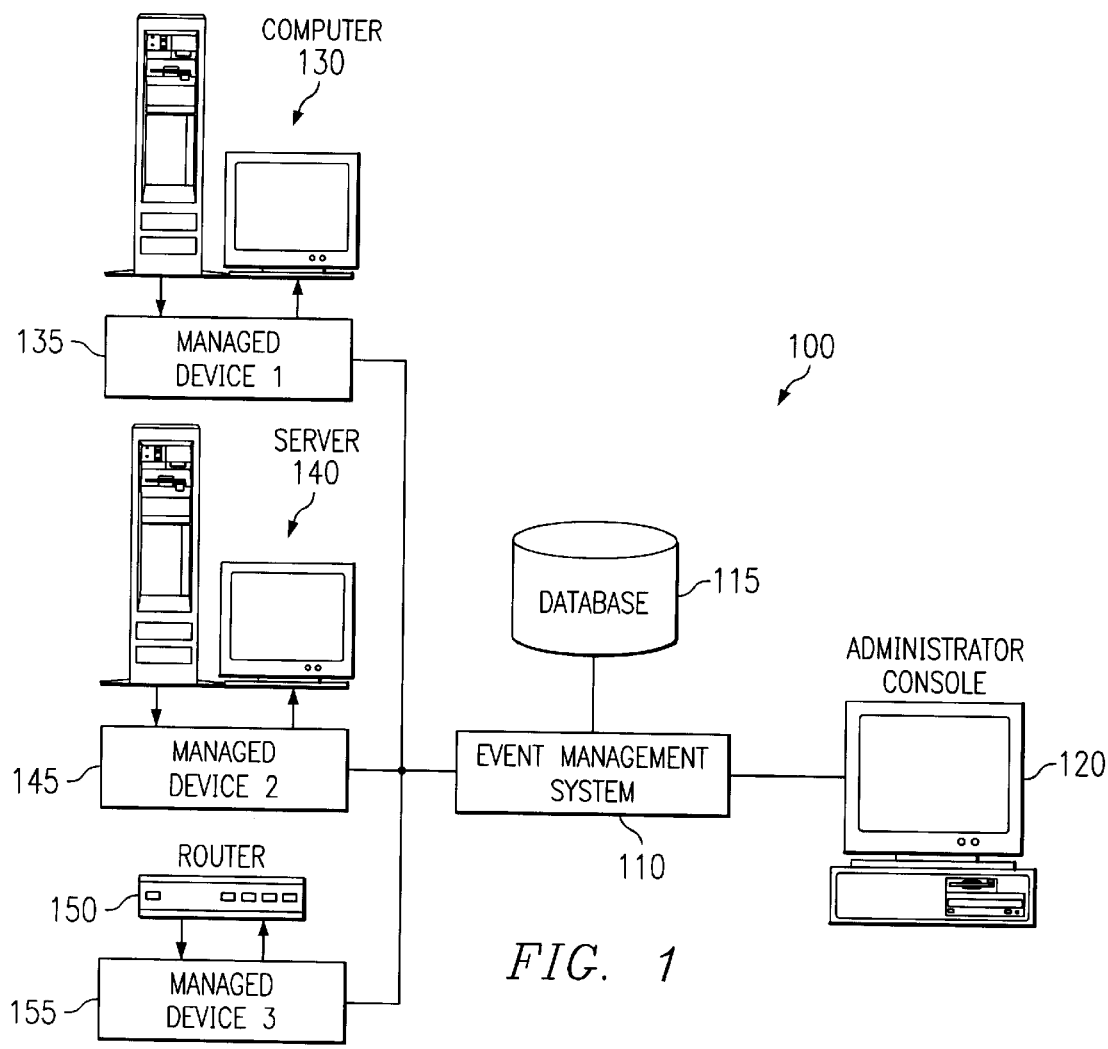
FIG. 1 is an exemplary diagram illustrating a known mechanism for event monitoring and management.

FIG. 1 is an exemplary diagram of a distributed data processing system according to a known event management system. As shown in FIG. 1, a plurality of network devices 130, 140 and 150 are provided, each having a managed device 135, 145 and 155 associated with it. The managed devices 135, 145 and 155 may be, for example, the network devices themselves, components of the network devices, applications and software running on these devices, and the like. These managed devices 135, 145 and 155 have client agents associated with them that allow the event management system 110 to manage events occurring on these managed devices.

The event management system 110 monitors the managed devices 135, 145 and 155 for both routine and non-routine events. Records, or event logs, of these events are stored in the associated database 115 for later use in reporting the events to a system administrator.

An event record is generated by the event management system 110 querying one or more tables in the database 115. The event management system 110 receives event messages from the client agents associated with the managed devices 135, 145, 155, and these events have a fixed number of attributes. For example, an event may be comprised of the following attributes: date, host name, time, message, source, origin, status, etc. Depending on the particular event, certain ones of these attributes will have associated values representing the event that occurred.

In other words, an event is a combination of fields stored in one or more tables in the database 115. The event management system 110 simply populates the appropriate fields in one or more tables in the database 115 when an event message is received from a client agent.

A system administrator may obtain access to the event logs stored in the database 115 through the administrator console 120. A display of the event log may be obtained by requesting a report from the event management system 110 or may be provided, in some cases, when certain events occur. When the administrator console 120 queries the event management system 110 for an event report, the event management system 110 retrieves the appropriate information from the various tables in the database 115 to thereby generate a report for the administrator console 120.

It is important to note that, with this known system, only a single event management system 110 is provided. In other words, a single vendor supplies the managed devices 135, 145, and 155 along with the event management system 110 such that there is a close coupling between the managed devices 135, 145, and 155 and the event management system 110.

In other networks, there may be a plurality of event management systems 110 managing different managed devices. In such a network, the system administrator is either required to access the event management system 110 from different administrator consoles 120 or access each event management system 110 individually, one at a time, to obtain information regarding events requiring the system administrator's attention.

The present invention alleviates the drawbacks of this known system by providing an event management system portal that integrates information obtained from a plurality of different event management systems. In this way, the system administrator may be provided with an integrated interface through which reports of the events encountered by the various event management systems may be accessed without having the system administrator individually access each event management system directly himself/herself.

Figure 2:
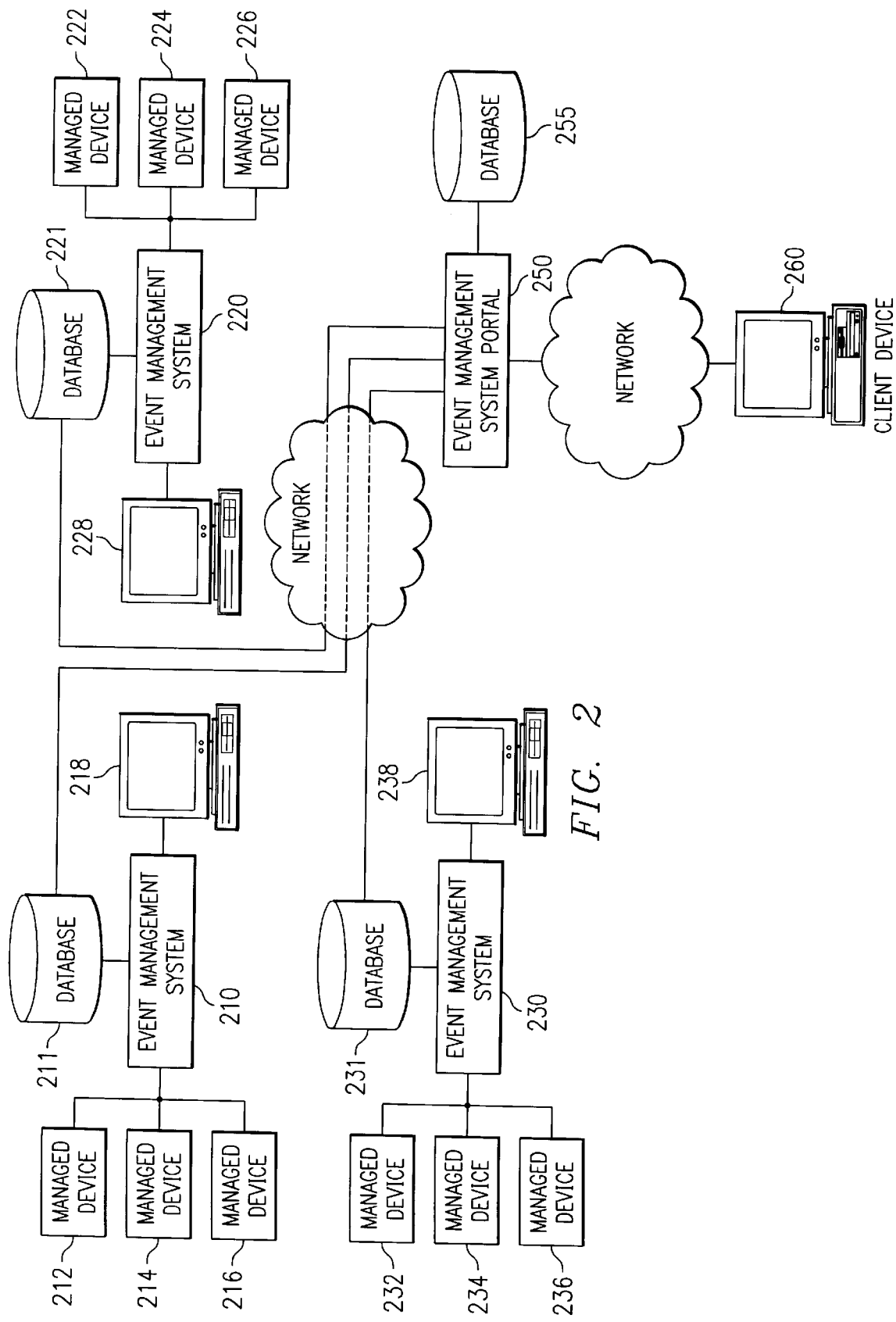
FIG. 2 is an exemplary diagram illustrating a network environment in which an event monitoring and management integration mechanism according to the present invention may operate.

FIG. 2 is an exemplary diagram illustrating a distributed data processing system according to the present invention. As shown in FIG. 2, a plurality of event management systems 210, 220 and 230 are used to manage and monitor the managed systems 212–216, 222–226 and 232–236 of the distributed data processing system. Each event management system 210, 220 and 230 also has an associated event database 211, 221, 231 which may be accessed by administrator consoles 218, 228 and 238. These elements are similar to known systems in which a plurality of event management systems are used to monitor and manage events from managed devices.

The present invention, however, provides an event management system (EMS) portal 250 that provides the functionality of obtaining event information from each of the event management systems databases 211, 221 and 231, and integrating this event information into a single interface for use with a client device 260. In addition, the EMS portal 250 further includes an associated database 255 in which the integrated event information may be stored as records or logs for later use.

The EMS portal 250 includes a client for each of the databases that exist in the event management systems that need to be queried. For example, a distributed data processing system may include a Tivoli Enterprise Console event management system and a Computer Associates Incorporated Unicenter event management system. In such a case, the EMS portal 250 would have both a DB2 client for communicating with the database associated with the Tivoli Enterprise Console event management system and a Oracle client for communicating with the HP event management system database.

The EMS portal 250 further includes an interface for communicating with the client device 260. In a preferred embodiment, the system administrator may access the EMS portal 250 by way of the client device 260. Appropriate security measures may be employed on the communication between the client device 260 and the EMS portal 250 in order to protect the distributed data processing system from third party attacks and/or hacking into the system.

The EMS portal 250 further includes one or more portal applications for performing the functions of the present invention. The one or more portal applications include applications that query the individual event management system databases 211, 221 and 231 using their respective clients resident in the EMS portal 250. The one or more portal applications further include applications that present the results of such queries using a single interface with the client device 260.

In a preferred embodiment of the present invention, the EMS portal 250 is resident on a server device with appropriate software applications for providing the database clients, webserver interface application, and portal applications of the present invention. The client device 260 preferably communicates with the EMS portal 250 server via a network, such as a local area network, wide area network, the Internet, or the like. The client device 260 may make use of a web browser application or other appropriate interface for communicating with the EMS portal 250 server.

Security protocols may be used for authentication of queries from the client device 260 to the EMS portal 250 server. For example, the client device 260 may communicate with the EMS portal 250 server using the Secure Socket Layer (SSL)/Hypertext Transport Protocol (HTTP), as is well known in the art. Other security measures, such as the use of digital signatures, digital certificates, encryption, and the like, may also be used to guard against unauthorized access to the event management system databases and event information.

In operation, the EMS portal 250 receives a query from the client device 260 for event log information. The query may include, for example, an indication of which event management systems from which event log information is requested and which tables, and fields of the tables, are of interest to the system administrator that initiated the request.

The designation of which tables and fields are of interest may be done globally such that the selection of tables and fields applies to each event management system or may be done for each individual event management system such that certain fields of certain tables are retrieve for a first event management system and other fields of the same or different tables are retrieved for a second event management system. This designation of event management systems, tables, and fields may be stored as a preference that may be retrieved at a later time in order to avoid having the administrator repeatedly enter the same request information.

The EMS portal 250 receives the query and instructs the appropriate database clients to transmit queries to the event management system databases 211, 221, and 231. The retrieved information is then stored in the EMS portal database 255. The retrieved information is then formatted into one or more appropriate reports by the EMS portal 250 into an appropriate format based on the selection of fields included in the event information request. The reports are then transmitted to the client device 260 for use by the administrator.

Figure 3:
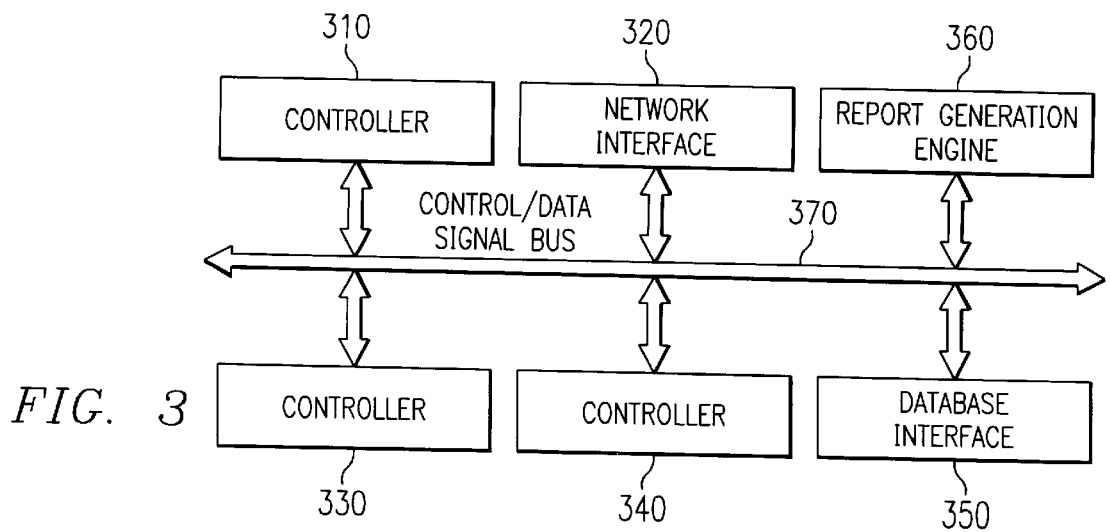
FIG. 3 is an exemplary block diagram of an event monitoring and management integration device according to the present invention.

FIG. 3 is a block diagram illustrating the primary operational components of the EMS portal according to the present invention. The components shown in FIG. 3 may be implemented as hardware, software, or any combination of hardware and software elements. In a preferred embodiment, the components are implemented as software instructions executed on one or more processors.

As shown in FIG. 3, the EMS portal includes a controller 310, a network interface 320, a plurality of EMS database clients 330–340, a database interface 350, and a report generation engine 360. These elements are coupled to one another via the control/data signal bus 370. Although a bus architecture is shown in FIG. 3, the present invention is not limited to such an implementation. Rather, any mechanism for facilitating the communication of control/data messages between the elements 310–360 may be used without departing from the spirit and scope of the present invention.

The controller 310 controls the overall operation of the EMS portal and orchestrates the operation of the other elements 320–360. The controller 310 receives requests for event information from client devices and supplies event information reports to these client devices via the network interface 320. In addition, in this exemplary embodiment, the EMS database clients 330 and 340 may communicate with the EMS databases via the network interface 320 or other communication interface (not shown).

The database interface 350 is used to store and retrieve event information stored in the portal database. This event information is received from the EMS databases in response to queries for the event information being sent from the EMS database clients 330 and 340. The EMS database clients 330 and 340 send queries to the EMS databases based on instructions received from the controller 310. The controller 310 sends such instructions to the EMS database clients 330 and 340 in response to the receipt of an event information request from a client device.

Figure 4:
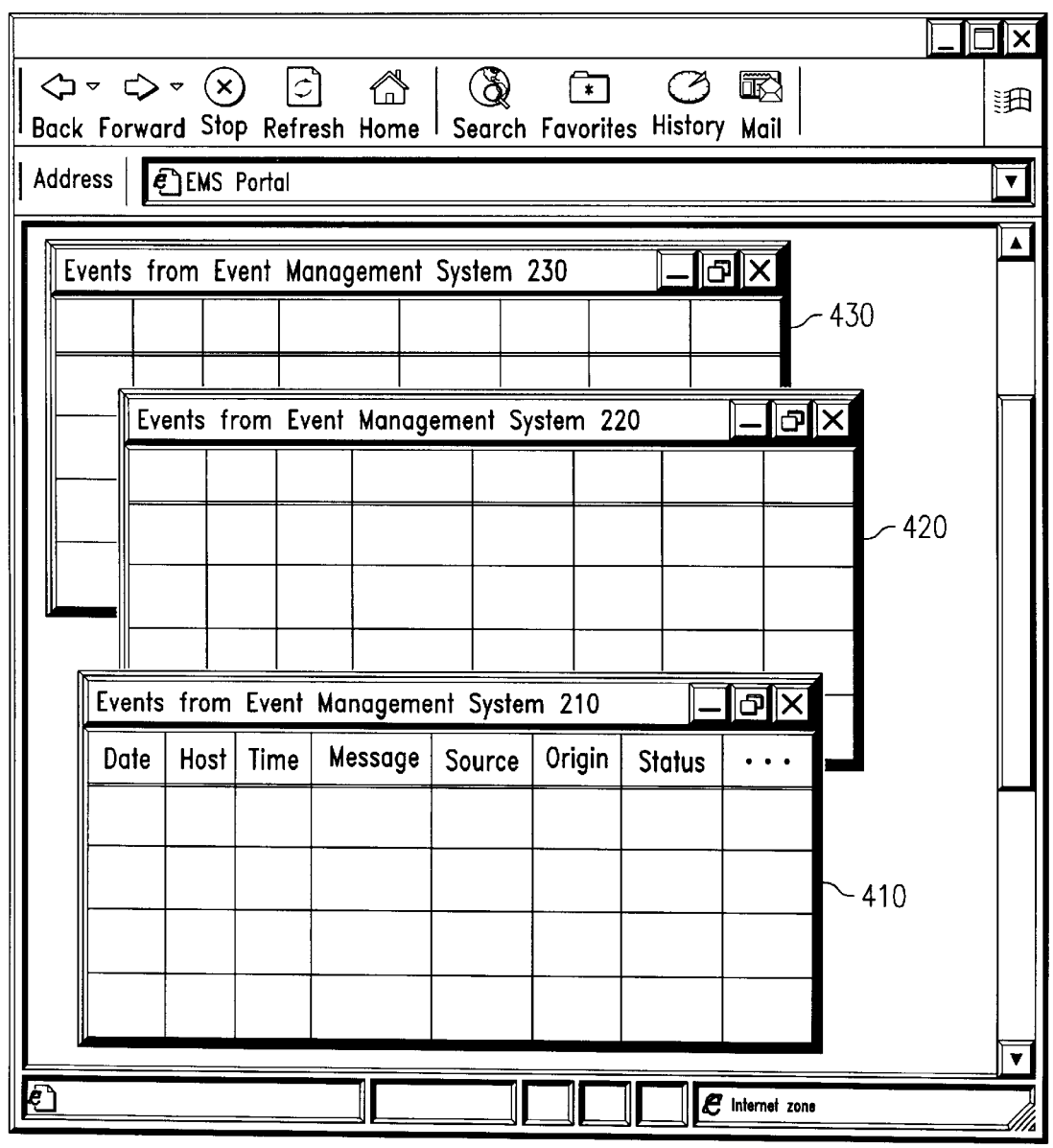
FIG. 4 is a diagram illustrating an integrated display of event management information according to the present invention.

FIG. 4 is an exemplary diagram illustrating an event information report as it is displayed on a client device. As shown in FIG. 4, the event information report may be comprised of a plurality of interfaces 410–430 each providing the event information for one or more of the EMS databases queried by the EMS portal.

In the particular exemplary embodiment shown in FIG. 4, the interfaces 410–430 are separate browser instances in a windowed environment. This allows a human system administrator to easily switch between interfaces in a manner generally known in the art. In other exemplary embodiments, these interfaces may be provided as a series of web pages, as spreadsheets, as text documents, or the like.

While the specific example shown in FIG. 4 illustrates the event information being provided to a system administrator via a browser application on the client device, the present invention is not limited to such. Rather, any mechanism for transmitting event information requests and displaying the resulting event information may be used without departing from the spirit and scope of the present invention. For example, the event information reports may be provided in an electronic mail format and may be displayed via an electronic mail program.

Alternatively, as touched upon above, the event information reports may be store sent as files, either downloaded to the client devices or sent as attachments to electronic mail messages, formatted in a known format for use with existing applications. For example, the event information reports may be stored as Microsoft Excel™ spreadsheet files, Lotus WordPro™ document files, or the like.

Although FIG. 4 shows a separate interface for each EMS database, the invention is not limited to such. Rather, any mechanism for displaying the event information may be used without departing from the spirit and scope of the present invention. For example, the results of the queries to the EMS databases may be combined into a single interface that is provided to the system administrator via the client device in any of the ways described previously.

In short, any mechanism may be used for sending requests for event information to the EMS portal and displaying event information reports received from the EMS portal. The key difference with these mechanisms and those used in the known art is that the system administrator is communicating with an EMS portal to which a single request may be sent and event information may be received from a plurality of different EMS databases.

FIG. 5 is a flowchart outlining an exemplary operation of the present invention. As shown in FIG. 5, the operation starts with receipt of a request for event information from a client device (step 510). The database clients are then used to query the EMS databases for the event information requested in the request received from the client device (step 520). The requested event information is then received from the EMS databases (step 530) and stored in the portal database (step 540). One or more event information reports are then generated based on the event information received from the EMS databases (step 550). The one or more reports are then transmitted to the requesting client device (step 560) and the operation ends.

Thus, the present invention provides an EMS portal through which a system administrator may query a plurality of different types of EMS databases with a single request for event information. This greatly reduces the burden on the system administrator and provides a mechanism by which event information may be retrieved from a plurality of different sources quickly and easily.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of retrieving event information from a plurality of event monitoring systems, comprising:
   receiving a request for event information;
   transmitting a query for the event information to each of a plurality of event monitoring systems based on the received request;
   receiving the event information from the plurality of event monitoring systems; and generating at least one report based on the received event information.

2. The method of claim 1, wherein at least two of the plurality of event monitoring systems are of different types from each other.

3. The method of claim 1, wherein transmitting a query for the event information to each of a plurality of event monitoring systems includes invoking a plurality of local clients, one for each event monitoring system in the plurality of event monitoring systems.

4. The method of claim 1, wherein the request is received from a client device via at least one network.

5. The method of claim 4, wherein the request is transmitted from the client device using a web browser application.

6. The method of claim 1, further comprising storing the event information received from the plurality of event monitoring systems in a database.

7. The method of claim 1, wherein the request includes at least one of a selection of event monitoring systems in the plurality of event monitoring systems, a selection of one or more event tables, and a selection of one or more event table fields.

8. The method of claim 1, wherein generating at least one report includes integrating the event information received from the plurality of event monitoring systems into a single report.

9. The method of claim 1, wherein generating at least one report includes generating a separate report for each event monitoring system in the plurality of event monitoring systems.

10. The method of claim 1, further comprising transmitting the at least one report to a source of the request such that the report is output in a windowed environment at the source.

11. A computer program product in a computer readable medium for retrieving event information from a plurality of event monitoring systems, comprising:

first instructions for receiving a request for event information;

second instructions for transmitting a query for the event information to each of a plurality of event monitoring systems based on the received request;

third instructions for receiving the event information from the plurality of event monitoring systems; and fourth instructions for generating at least one report based on the received event information.

12. The computer program product of claim 11, wherein at least two of the plurality of event monitoring systems are of different types from each other.

13. The computer program product of claim 11, wherein the second instructions for transmitting a query for the event information to each of a plurality of event monitoring systems include instructions for invoking a plurality of local clients, one for each event monitoring system in the plurality of event monitoring systems.

14. The computer program product of claim 11, wherein the request is received from a client device via at least one network.

15. The computer program product of claim 14, wherein the request is transmitted from the client device using a web browser application.

16. The computer program product of claim 11, further comprising fifth instructions for storing the event information received from the plurality of event monitoring systems in a database.

17. The computer program product of claim 11, wherein the request includes at least one of a selection of event monitoring systems in the plurality of event monitoring systems, a selection of one or more event tables, and a selection of one or more event table fields.

18. The computer program product of claim 11, wherein the fourth instructions for generating at least one report include instructions for integrating the event information received from the plurality of event monitoring systems into a single report.

19. The computer program product of claim 11, wherein the fourth instructions for generating at least one report include instructions for generating a separate report for each event monitoring system in the plurality of event monitoring systems.

20. The computer program product of claim 11, further comprising fifth instructions for transmitting the at least one report to a source of the request such that the report is output in a windowed environment at the source.

21. An apparatus for retrieving event information from a plurality of event monitoring systems, comprising:

means for receiving a request for event information;

means for transmitting a query for the event information to each of a plurality of event monitoring systems based on the received request;

means for receiving the event information from the plurality of event monitoring systems; and means for generating at least one report based on the received event information.

22. The apparatus of claim 21, wherein at least two of the plurality of event monitoring systems are of different types from each other.

23. The apparatus of claim 21, wherein the means for transmitting a query for the event information to each of a plurality of event monitoring systems includes means for invoking a plurality of local clients, one for each event monitoring system in the plurality of event monitoring systems.

24. The apparatus of claim 21, wherein the request is received from a client device via at least one network.

25. The apparatus of claim 24, wherein the request is transmitted from the client device using a web browser application.

26. The apparatus of claim 21, further comprising means for storing the event information received from the plurality of event monitoring systems in a database.

27. The apparatus of claim 21, wherein the request includes at least one of a selection of event monitoring systems in the plurality of event monitoring systems, a selection of one or more event tables, and a selection of one or more event table fields.

28. The apparatus of claim 21, wherein the means for generating at least one report includes means for integrating the event information received from the plurality of event monitoring systems into a single report.

29. The apparatus of claim 21, wherein the means for generating at least one report includes means for generating a separate report for each event monitoring system in the plurality of event monitoring systems.

30. The apparatus of claim 21, further comprising means for transmitting the at least one report to a source of the request such that the report is output in a windowed environment at the source.

* * * * *